July 10, 1923.

W. F. BORN

GARBAGE INCINERATOR

Filed April 3, 1922

1,461,108

INVENTOR.
William F. Born
BY
Fay, Oberlin & Fay
ATTORNEYS

Patented July 10, 1923.

1,461,108

UNITED STATES PATENT OFFICE.

WILLIAM F. BORN, OF LAKEWOOD, OHIO.

GARBAGE INCINERATOR.

Application filed April 3, 1922. Serial No. 548,925.

*To all whom it may concern:*

Be it known that I, WILLIAM F. BORN, a citizen of the United States, and a resident of Lakewood, county of Cuyahoga, and State of Ohio, have invented a new and useful Improvement in Garbage Incinerators, of which the following is a specification, the principle of the invention being herein explained and the best mode in which I have contemplated applying that principle, so as to distinguish it from other inventions.

The present invention relates to garbage incinerators, and more particularly, to an incinerator adapted for household use and one which may be easily and readily used in the home. The present incinerator comprises a heating chamber suitably insulated so as to retain heat and an outer water jacket used to condensate the vapors, and the whole is so arranged that it may be connected to a lamp socket as a source of heat supply and is easily and readily movable. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
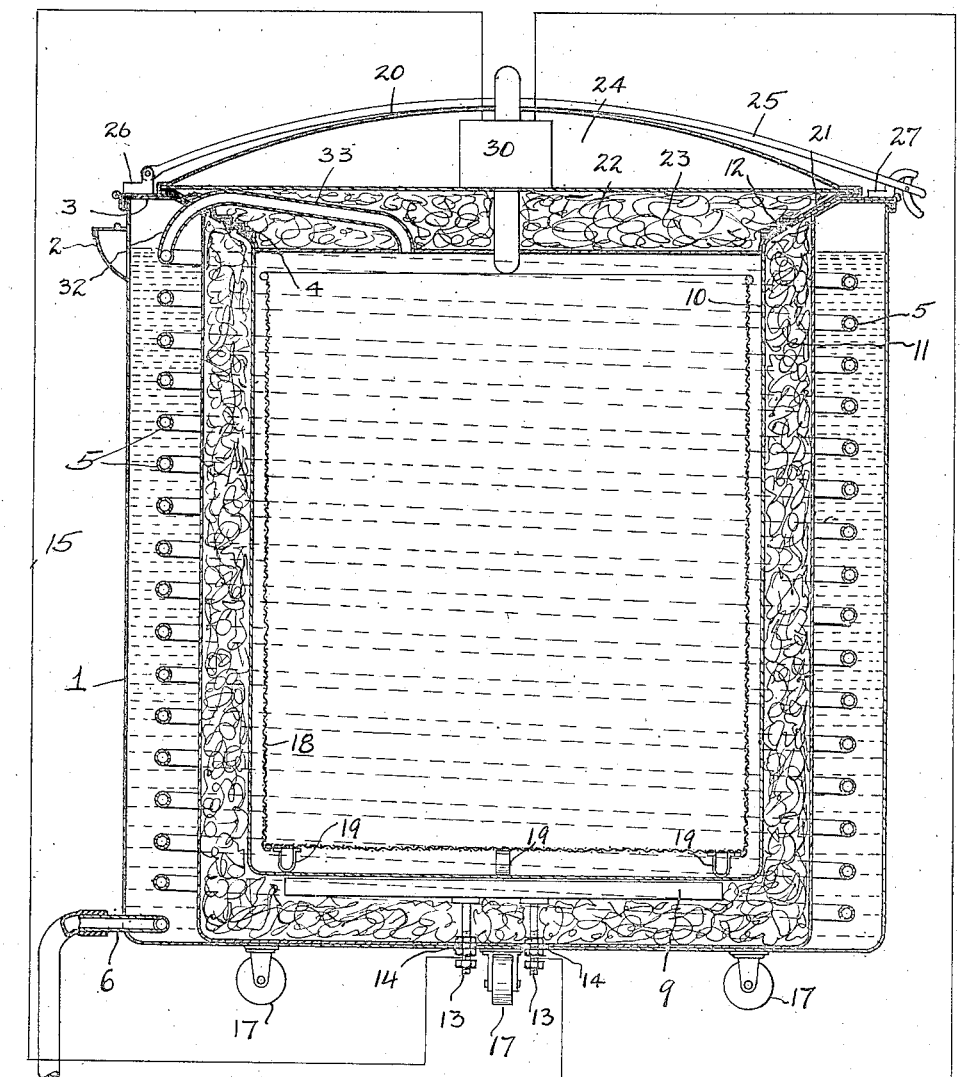
Figure 2:
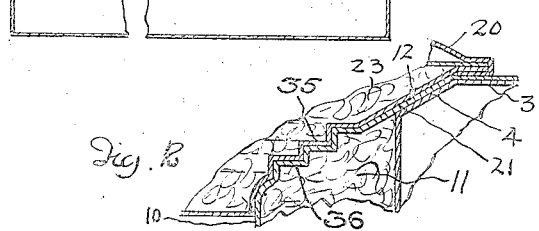

Fig. 1 is a central vertical section through the device; and Fig. 2 is a sectional view of a detail.

As shown in the drawing, the present incinerator comprises a double walled outer casing 1 which is closed except for a filling cap 2 at one side, this outer casing having a flat upper surface 3 and an inclined surface 4. The bottoms of the two casings are formed integral with the two jackets and welded or otherwise secured together to form a water-tight bottom, and the space between the wall is filled with water or other cooling liquid. A condensing coil 5 is mounted between the two casings in the cooling liquid and is provided with an outlet pipe 6 extending into a receiving pan 7 which is sealed except for a pin hole opening 8 to prevent a vacuum, the opening being as minute as possible.

Within the double walled outer casing is mounted a heating pot or inner jacket 10 spaced away from the outer casing, the space being completely filled with insulating material 11 of any suitable description. This heating pot has at the top an inclined flange 12 fitting the inclined top surface 4 of the outer casing and below the top 4, the flange 12 is provided with a series of annular steps 36. Closely adjacent the inner pot is mounted heating means 9, here shown as being a suitable electric grid, mounted in the insulating material in the bottom, although the grids or heating elements may be mounted adjacent the sides of the container. As shown, two contact rods 13 are passed through the bottom of the casing from which they are suitably insulated by being mounted in bushings 14 and these contacts are connected to the wires 15 and 16. The outer casing is mounted on suitable castor wheels 17 so that it may be easily moved from place to place. Within the heating pot is mounted a basket 18 of reticulated material which is provided with feet 19 to space it away from the bottom of the pot.

To tightly seal the casing, a cover 20 is provided which is formed of metal having an inclined annular face 21 formed with steps 35 adapted to seat within the inclined stepped surfaces 36 of the pot and this cover is divided into two chambers, the lower chamber 22 being filled with insulating material 23, while the upper chamber 24 forms an air space. A clamping yoke 25 is supplied to hold the cover in position, this yoke being pivotally attached to a bracket 26 at one end and being adapted to engage with a cam surface hook member 27 mounted on the opposite side of the pot so that the cover may be forced down tightly to furnish an air-tight seal, the yoke contacting the cover at the center to equalize the pressure.

Within the cover is mounted a thermostatic control switch 30 connected in circuit with the wire 15 and then leading to a plug 31 with the other wire 16 and this control switch may be set to shut off the heating element when a predetermined temperature is reached or it may be of the type which will control the heating element to maintain a constant temperature if desired. The plug is of the type adapted to fit a lamp socket or the like so that the apparatus may be connected at any convenient point.

The condensing coil is connected to the heating pot by means of a pipe 32 extending from the coil to the inclined surface of the outer casing, with a second communicating pipe 33 through the cover to the pot, the inclined surfaces of the cover and pot, and jacket, forming an air-tight seal around the two pipes so that no coupling need be employed.

The present incinerator is of the fireless cooker type and of a size suitable for household use, the heating pot and basket being of a size adapted to receive the garbage of a family for a day at a time. The garbage is placed in the basket, the cover put on and the device attached to a source of heat and left connected. As soon as the interior has reached the predetermined temperature, the automatic control switch will open the circuit and the device will continue to operate, due to stored heat, to vaporize the moisture in the garbage until it has cooled below the boiling point. Any temperature above the boiling point may be used, but preferably a temperature of from 600° to 1000° Fahrenheit will be used.

As the heating pot is insulated, the heat loss is low and it has been found possible to have a temperature drop of not to exceed 100° after about eight hours which is long enough to complete the reduction process when the basket is filled with very moist material.

The receiving pan is large enough to contain all the moisture that will be condensed from a single charge and may then be removed and emptied. The pan may be formed integrally with the device or suitably carried thereon, or if the installation is to be permanent, it may be dispensed with.

The device is entirely sealed during the cooking process and there are no disagreeable odors arising from the device so that it may be used in the house, being connected at any convenient point in the kitchen or basement.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an incinerator of the class described, the combination of a double walled outer casing adapted to hold a cooling liquid, a heating pot mounted within such casing and spaced and insulated therefrom, means for heating said pot, a condensing coil mounted in such cooling liquid and connected to said pot, and an air-tight cover for said casing and pot.

2. In an incinerator of the class described, the combination of a double walled outer casing adapted to hold a cooling liquid, a heating pot mounted within such casing and spaced and insulated therefrom, means for heating said pot, a condensing coil mounted in such cooling liquid and connected to said pot, an air-tight cover for said casing and pot, and a closed receptacle removably connected to said condensing coil for receiving the condensed liquid.

3. In an incinerator of the class described, the combination of a double walled outer casing provided with a filling opening and adapted to be filled with a cooling liquid, a heating pot mounted within and spaced from said casing, such space being filled with insulating material, a heating element mounted in such insulation adjacent said pot, an air-tight cover for said casing and pot, a condensing coil mounted in the cooling liquid in said double casing, and having connection with said pot, and a receiving pan detachably connected to said condensing coil for receiving the condensed liquid.

4. In an incinerator of the class described, the combination of a double walled outer casing provided with a filling opening and adapted to be filled with a cooling liquid, a heating pot mounted within and spaced from said casing, such space being filled with insulating material, a heating element mounted in such insulation adjacent said pot, a cover for said casing and pot adapted to form an air-tight seal, said cover comprising an insulated chamber and an air chamber over the same, a condensing coil mounted in said outer casing in such cooling liquid, connections between said coil and said pot through said cover, and a closed receiving pan detachably connected to said condensing coil to receive the condensed liquid.

5. In an incinerator, the combination of a double walled outer casing, adapted to be filled with a cooling liquid, an insulated heating pot mounted therein, a condensing coil mounted in such double walled casing, a cover for said casing and pot and adapted to seal the latter, an electric heating element in said casing to heat said pot, and a thermostatic control member mounted in said cover to extend into said pot and connected in circuit with said heating element to automatically regulate the temperature in said pot.

6. An incinerator for household use, comprising a double walled outer casing filled with cooling liquid, said casing being provided with a filling spout and having caster wheels, a condensing coil mounted in such cooling liquid in said casing, a heating pot mounted in said casing and spaced and insulated therefrom, a heating element in said casing adjacent said pot, a cover for said casing and pot and adapted to form an airtight seal with the latter, automatic regulating means mounted in said cover and adapted to control said heating element, connection between said pot and said condensing coil, and a receiving pan detachably connected to said condensing coil.

7. An incinerator for household use, comprising a double walled outer casing filled with cooling liquid, said casing being provided with a filling spout and having caster wheels, a condensing coil mounted in such cooling liquid in said casing, and having its upper pipe opening through the upper surface of said casing, a heating pot mounted in said casing and spaced and insulated therefrom, an electric heating element mounted in said casing adjacent said cooking pot, a cover for said casing and pot and adapted to form an air-tight seal with the latter, a conduit in said cover communicating with said pot and said upper pipe of said condensing coil, said cover being adapted to form a seal around such conduit and pipe, automatic regulating means in said cover connected to said heating element and adapted to control the heat supply according to the temperature in said pot, and a receiving pan detachably connected to said condensing coil and adapted to receive the condensed liquid.

8. An incinerator for household use, comprising a double walled outer casing filled with cooling liquid, said casing being provided with a filling spout and having caster wheels, a condensing coil mounted in such cooling liquid in said casing, and having its upper pipe opening through the upper surface of said casing, a heating pot mounted in said casing and spaced and insulated therefrom, an electric heating element mounted in said casing adjacent said heating pot, a cover for said casing and pot and adapted to form an air-tight seal with the latter, said cover being divided into two chambers, the lower chamber being filled with insulating material and the upper chamber forming an air space, a conduit through such lower cover chamber communicating with said pot and said upper condensing coil pipe, said cover being adapted to form a seal around said pipe and such conduit, automatic regulating means in said cover connected to said heating element and adapted to control the heat supply according to the temperature in said pot, and a receiving pan detachably connected to said condensing coil and adapted to receive the condensed liquid.

Signed by me, this 30th day of March, 1922.

WILLIAM F. BORN.